(12) United States Patent
Mohanty et al.

(10) Patent No.: US 11,694,686 B2
(45) Date of Patent: Jul. 4, 2023

(54) VIRTUAL ASSISTANT RESPONSE GENERATION

(71) Applicant: Dell Products L.P., Round Rock, TX (US)

(72) Inventors: Bijan Kumar Mohanty, Austin, TX (US); Dhilip S. Kumar, Bangalore (IN); Jaganathan Subramanian, Bangalore (IN); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 17/209,372

(22) Filed: Mar. 23, 2021

(65) Prior Publication Data

US 2022/0310083 A1   Sep. 29, 2022

(51) Int. Cl.
| | |
|---|---|
| *G10L 15/22* | (2006.01) |
| *G10L 15/18* | (2013.01) |
| *G10L 15/30* | (2013.01) |
| *G06F 9/451* | (2018.01) |
| *G06F 16/901* | (2019.01) |
| *G06N 20/00* | (2019.01) |

(52) U.S. Cl.
CPC .............. *G10L 15/22* (2013.01); *G06F 9/453* (2018.02); *G06F 16/9024* (2019.01); *G10L 15/1815* (2013.01); *G10L 15/30* (2013.01); *G06N 20/00* (2019.01); *G10L 2015/223* (2013.01)

(58) Field of Classification Search
CPC ..... G10L 15/22; G10L 15/1815; G10L 15/30; G10L 2015/223; G10L 15/1822; G06F 9/453; G06F 16/9024; G06F 40/216; G06F 40/279; G06F 40/35; G06N 20/00; G06N 3/0454; G06N 3/0445; G06N 3/08; G06N 5/02
See application file for complete search history.

(56) References Cited

U.S. PATENT DOCUMENTS

| | | | |
|---|---|---|---|
| 10,963,493 B1 * | 3/2021 | Hu | G05D 1/0016 |
| 2019/0204907 A1 * | 7/2019 | Xie | G06F 3/017 |
| 2019/0304157 A1 * | 10/2019 | Amer | G06V 20/41 |
| 2022/0093101 A1 * | 3/2022 | Krishnan | G06V 40/168 |
| 2022/0129556 A1 * | 4/2022 | Chen | G06V 10/40 |

OTHER PUBLICATIONS

Wikipedia, "Natural Language," https://en.wikipedia.org/w/index.php?title=Natural_language&oldid=977532848, Sep. 9, 2020, 3 pages.
Wikipedia, "Natural-language Generation," https://en.wikipedia.org/w/index.php?title=Natural-language_generation&oldid=983323430, Oct. 13, 2020, 7 pages.
Wikipedia, "Chatbot," https://en.wikipedia.org/w/index.php?title=Chatbot&oldid=982264678, Oct. 7, 2020, 12 pages.

* cited by examiner

*Primary Examiner* — Abul K Azad
(74) *Attorney, Agent, or Firm* — Ryan, Mason & Lewis, LLP

(57) ABSTRACT

A method comprises receiving at least one natural language input, converting the at least one natural language input to a graphical input, retrieving relationship data from a graph database based at least in part on the graphical input, and generating at least one natural language response of a virtual assistant to the at least one natural language input based at least in part on the relationship data from the graph database. At least the generating is performed using one or more machine learning models.

20 Claims, 20 Drawing Sheets

```
import numpy as np
import pandas as pd
from nltk.corpus import stopwords
from nltk.tokenize import word_tokenize
from nltk.stem.lancaster import LancasterStemmer
import nltk
import re
from sklearn.preprocessing import OneHotEncoder
import matplotlib.pyplot as plt
from keras.preprocessing.text import Tokenizer
from keras.preprocessing.sequence import pad_sequences
from keras.utils import to_categorical
from keras.models import Sequential, load_model
from keras.layers import Dense, LSTM, Bidirectional, Embedding, Dropout
from keras.callbacks import ModelCheckpoint def load_dataset(filename):
    df = pd.read_csv(filename, encoding = "latin1", names = ["Sentence", "Intent"])
    print(df.head())
    intent = df["Intent"]
    unique_intent = list(set(intent))
    sentences = list(df["Sentence"])

return (intent, unique_intent, sentences)

intent, unique_intent, sentences = load_dataset("IntentClassification_data.csv")
print(sentences[:5])
```

FIG. 9

```
#First Conv1D layer
conv = Conv1D(8, 11, padding='valid', activation='relu', strides=4)(inputs)
conv = MaxPooling1D(3)(conv)
conv = Dropout(0.3)(conv)

#Second Conv1D layer
conv = Conv1D(16, 11, padding='valid', activation='relu', strides=1)(conv)
conv = MaxPooling1D(3)(conv)
conv = Dropout(0.3)(conv)

#Third Conv1D layer
conv = Conv1D(32, 9, padding='valid', activation='relu', strides=1)(conv)
conv = MaxPooling1D(3)(conv)
conv = Dropout(0.3)(conv)

#Fourth Conv1D layer
conv = Conv1D(64, 7, padding='valid', activation='relu', strides=1)(conv)
conv = MaxPooling1D(3)(conv)
conv = Dropout(0.3)(conv)

#Flatten layer
conv = Flatten()(conv)

#Dense layer 1
conv = Dense(256, activation='relu')(conv)
conv = Dropout(0.3)(conv)

#Dense layer 2
conv = Dense(128, activation='relu')(conv)
conv = Dropout(0.3)(conv)

outputs = Dense(len(labels), activation='softmax')(conv)
```

FIG. 13

```
def create_model(max_sequence_len, total_words):
    input_len = max_sequence_len - 1
    model = Sequential()

# Add Input Embedding Layer
    model.add(Embedding(total_words, 10, input_length=input_len))

# Add Hidden Layer 1 - LSTM Layer
    model.add(LSTM(100))
    model.add(Dropout(0.1))

# Add Output Layer
    model.add(Dense(total_words, activation='softmax'))

model.compile(loss='categorical_crossentropy', optimizer='adam')

return model model = create_model(max_sequence_len, total_words)
model.summary()

model.fit(predictors, label, epochs=100, verbose=5)

def generate_text(seed_text, next_words, model, max_sequence_len):
    for _ in range(next_words):
        token_list = tokenizer.texts_to_sequences([seed_text])[0]
        token_list = pad_sequences([token_list], maxlen=max_sequence_len-1, padding='pre')
        predicted = model.predict_classes(token_list, verbose=0)
```

FIG. 15

| INTENT | SENTIMENT | PRIORITY | REGION | CONTEXT | ACTION |
|---|---|---|---|---|---|
| Discussion | Anxious | Urgent | Global | Case Outage | 1 (schedule meeting) |
| Question | Neutral | Normal | Americas | Payroll | 2 (reply to email) |

FIG. 16

```
# ignore all future warnings
simplefilter(action='ignore', category=FutureWarning)

runtime_data = pd.read_csv("data/actionDecision.csv",sep=',', header= None)

print (runtime_data)

print ("Dataset Length: ", len(runtime_data))
print ("Dataset Shape: ", runtime_data.shape)

clean_runtime_data = runtime_data[runtime_data[6] != '?']
print(clean_runtime_data)

X = clean_runtime_data.values[:, 1:11]
Y = clean_runtime_data.values[:, 0]

X_train, X_test, y_train, y_test = train_test_split( X, Y, test_size = 0.3, random_state = 100)

y_train = y_train.astype('int')
y_test = y_test.astype('int')

trained_model = RandomForestClassifier()
trained_model.fit(X_train, y_train)

predictions = trained_model.predict(X_test)

# Train and Test Accuracy
print("Train Accuracy :: ", accuracy_score(y_train, trained_model.predict(X_train)))
print("Test Accuracy  :: ", accuracy_score(y_test, predictions))
```

FIG. 18

VIRTUAL ASSISTANT RESPONSE GENERATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to using machine learning (ML) to generate virtual assistant responses.

BACKGROUND

Conversational artificial intelligence (AI) is a significant enterprise enabler in today's modern enterprise processes. Chatbots or other virtual assistants use conversational AI, and are utilized by organizations to automate their processes. Virtual assistants are generally used as information acquisition interfaces, and are becoming popular as task executors. Virtual assistants may answer queries and perform task-specific programmable actions.

Existing virtual assistants may be tailored to specific application domains. For example, such virtual assistants may provide limited support of application utilities, and may be available on hand-held devices such as, for example, mobile phones and tablets. These virtual assistants are generic and designed to execute general-purpose tasks.

SUMMARY

Illustrative embodiments provide techniques to use ML to configure virtual assistants to provide responses based on relationship data.

In one embodiment, a method comprises receiving at least one natural language input, converting the at least one natural language input to a graphical input, retrieving relationship data from a graph database based at least in part on the graphical input, and generating at least one natural language response of a virtual assistant to the at least one natural language input based at least in part on the relationship data from the graph database. At least the generating is performed using one or more machine learning models.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 9 depicts example pseudocode for intent analysis and classification according to an illustrative embodiment.

FIG. 13 depicts example pseudocode for speech-to-text conversion according to an illustrative embodiment.

FIG. 15 depicts example pseudocode for message generation and augmentation according to an illustrative embodiment.

FIG. 16 depicts a table including details of virtual assistant action recommendation training data according to an illustrative embodiment.

FIG. 18 depicts example pseudocode for virtual assistant action recommendation according to an illustrative embodiment.

DETAILED DESCRIPTION

Figure 1:
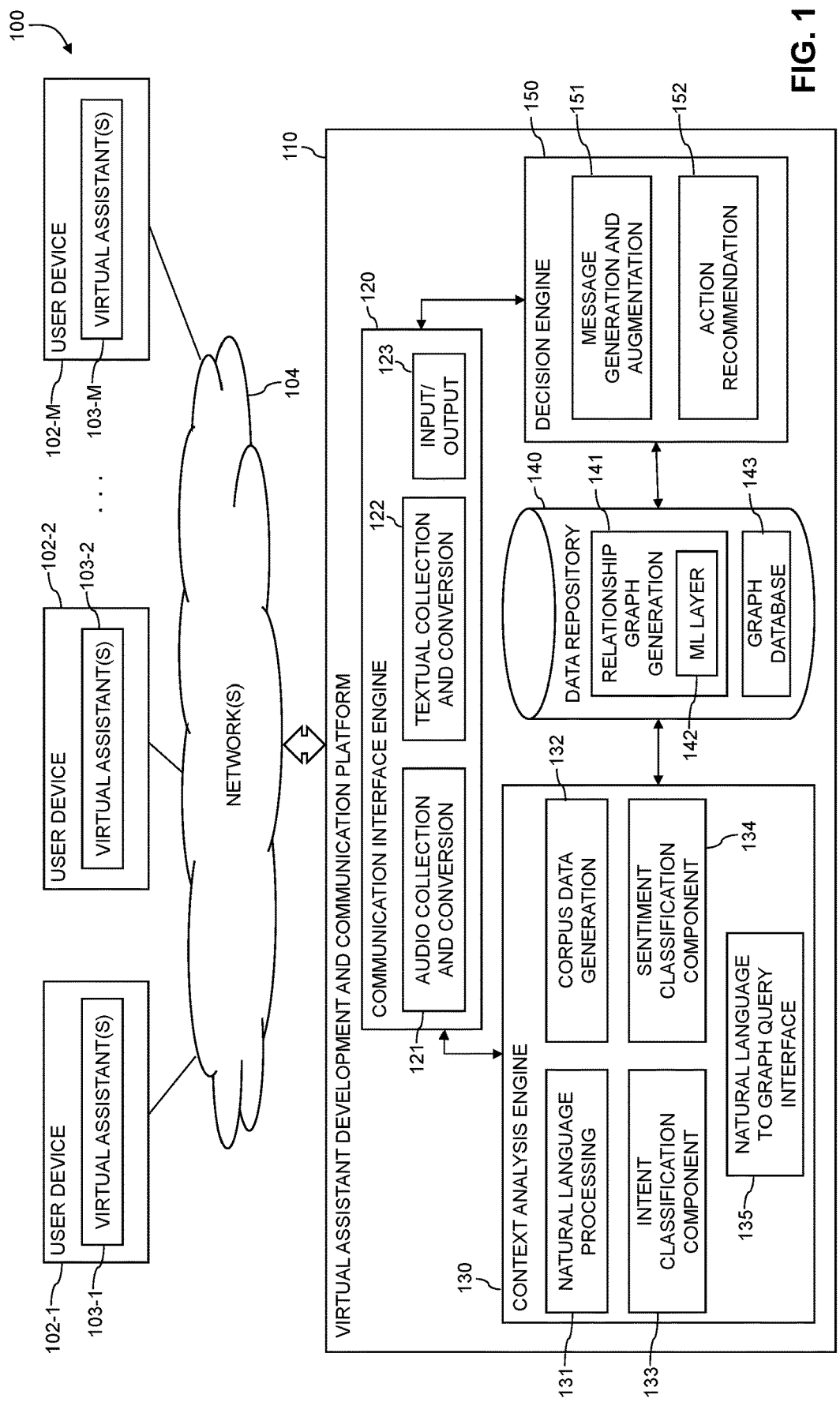
FIG. 1 depicts details of an information processing system with a virtual assistant development and communication platform for analyzing incoming natural language inputs and recommending appropriate virtual assistant responses according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown.

Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in AI where natural language input is disassembled and parsed to determine appropriate syntactic and semantic schemes in order to comprehend and use languages. NLU may rely on computational models that draw from linguistics to understand how language works, and comprehend what is being said by a user.

As used herein, "natural language generation (NLG)" is to be broadly construed to refer to a computer process that transforms data into natural language. For example, NLG systems decide how to put concepts into words. NLG can be accomplished by training ML models using a corpus of human-written texts.

In an illustrative embodiment, ML techniques are used to extend virtual assistant capabilities beyond what is currently available to be configured to provide responses and actions tailored for a specific user. For example, the responses and actions of the virtual assistants are based on user trends and behavior learned over a period of time using one or more ML models. Advantageously, the embodiments provide intelligent virtual assistants that accumulate users' domain expertise based on, for example, the users' conversations, meetings and the people with which the users communicate. The virtual assistants maintain and manage user data, brief communications and/or meetings of the user, clarify questions and perform functions on behalf of the user. The embodiments use one or more ML techniques to provide a domain and user-specific virtual assistant that learns and builds expertise based on a user's behavior and decision-making over time.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a virtual assistant development and communication platform 110.

The user devices 102 can comprise, for example, Internet of Things (IoT) devices, desktop, laptop or tablet computers, mobile telephones, or other types of processing devices capable of communicating with the virtual assistant development and communication platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The user devices 102 comprise one or more virtual assistants 103-1, 103-2, . . . 103-M (collectively "virtual assistants 103") running on the user devices 102. Alternatively, the virtual assistants 103 may be running on separate devices from the user devices 102 and are accessible by the user devices 102.

As used herein, the term "virtual assistant" is to be broadly construed and may comprise, for example, AI based intelligent agents or other software applications that use input from the virtual assistant development and communication platform 110 to provide messages to and perform and/or orchestrate tasks on behalf of users. Such tasks can include, but are not necessarily limited to, replying to emails, virtually attending meetings and generating meeting summaries, identifying and recommending priority actions and automatically participating in chat conversations. Virtual assistants as used herein are capable of multilingual and multimode communication including, but not necessarily limited to, text-to-text, text-to-speech, speech-to-text and speech-to-speech. Virtual assistants may also comprise, for example, chatbots or other software applications that can be used to conduct online conversations with users via text or speech, in lieu of providing direct contact with a live human agent. The virtual assistants simulate a conversational partner, and may be used in connection with, for example, information acquisition, user queries, customer service and request routing. The virtual assistants may be executed on one or more processing devices or virtualized computing resources. The variable M and other similar index variables herein such as K and L are assumed to be arbitrary positive integers greater than or equal to two.

The terms "client," "customer" or "user" herein are intended to be broadly construed so as to encompass numerous arrangements of human, hardware, software or firmware entities, as well as combinations of such entities. Virtual assistant development and communication services may be provided for users utilizing one or more machine learning models, although it is to be appreciated that other types of infrastructure arrangements could be used. At least a portion of the available services and functionalities provided by the virtual assistant development and communication platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the virtual assistant development and communication platform 110, as well as to support communication between the virtual assistant development and communication platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the virtual assistant development and communication platform 110.

The virtual assistant development and communication platform 110 in the present embodiment is assumed to be accessible to the user devices 102, and vice-versa, over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The virtual assistant development and communication platform 110, on behalf of respective infrastructure tenants each corresponding to one or more users associated with respective ones of the user devices 102, provides a platform for analyzing incoming natural language inputs and recommending and/or generating appropriate virtual assistant responses and/or actions.

Referring to FIG. 1, the virtual assistant development and communication platform 110 comprises a communication interface engine 120, a context analysis engine 130, a data repository 140, and a decision engine 150. The communication interface engine 120 comprises an audio collection and conversion component 121, a textual collection and conversion component 122 and an input/output component 123. The context analysis engine 130 comprises a natural language processing (NLP) component 131, a corpus data generation component 132, an intent classification component 133, a sentiment classification component 134 and a natural language to graph query interface component 135. The data repository 140 comprises a relationship graph generation component 141 comprising a machine learning (ML) layer 142, and a graph database 143. The decision engine 150 comprises a message generation and augmentation component 151 and an action recommendation component 152.

Figure 3:
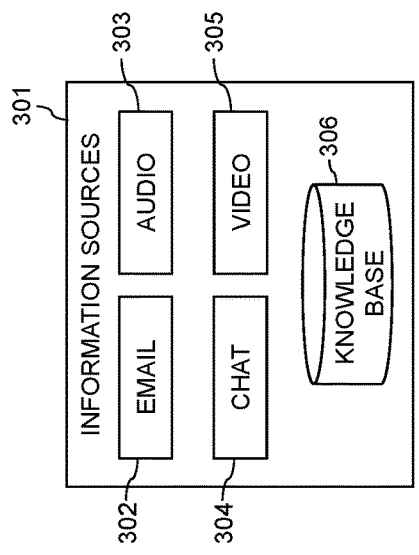
FIG. 3 depicts example information sources for natural language inputs to the virtual assistant development and communication platform according to an illustrative embodiment.

The communication interface engine 120 receives communications in textual and audio formats from, for example, information sources 301 shown in FIG. 3. In a non-limiting illustrative embodiment, the information sources 301 comprise, for example, email 302, audio sources 303, chat sources 304, video sources 305 and/or data from a knowledge base 306. The audio sources 303 include, but are not necessarily limited to, voice messages (e.g., voicemail messages), and/or audio from meetings, presentations, conferences, recorded conversations, etc. The video sources 305 include, but are not necessarily limited to, video from meetings, presentations, conferences, etc. The knowledge base 306 may include data in the form of, for example, articles, papers, guidelines, policies, regulations, etc. that may affect user actions and decision-making, especially when affiliated with a business or other enterprise. The communication interface engine 120 provides an interface layer for communications with external systems and devices. Inbound or outbound communications involving multiple types of messages such as, for example, email, voice and chat messages, pass through the communication interface engine 120 before and after being processed by the virtual assistant development and communication platform 110.

The audio collection and conversion component 121 uses speech-to-text techniques to convert received audio communications into textual data. The textual data is input to and analyzed by the context analysis engine 130. The textual collection and conversion component 122 receives textual input from, for example, the decision engine 150, and, using text-to-speech techniques, converts the textual input into audio to be distributed to one or more users via virtual assistants 103 configured to interact with users using speech or other types of audio interfaces. The input/output component 123 provides interfaces for user devices 102 to access the virtual assistant development and communication platform 110 and for user devices 102 to receive outputs from the virtual assistant development and communication platform 110. The input/output component 123 receives and processes incoming requests from users (e.g., via user devices 102 and their corresponding virtual assistants 103). The requests comprise natural language inputs comprising, for example, statements, queries, requests for services (e.g., information technology (IT), human resources (HR)) requests), requests for documents, requests for help/support, requests for information, requests for status, audio transcripts and/or audio files, video transcripts and/or video files, chat transcripts and/or files, emails and other types of natural language inputs. The natural language inputs may come from any of the information sources 301 described herein. The input/output component 123 further receives and processes outgoing responses to user devices 102 and their corresponding virtual assistants 103. The responses comprise natural language responses and/or recommended actions to be provided and/or performed by the virtual assistants 103 in response to one or more natural language inputs. The input/output component 123 may format outputs from the decision engine 150 to be displayed and/or transmitted via one or more channels on different types of interfaces (e.g., mobile, webpage, email, chat, audio, video, etc.). The input/output component 123 comprises one or more application programming interfaces (APIs) to interface with the channels, different elements of the virtual assistant development and communication platform 110, the user devices 102 and/or the virtual assistants 103. The input/output component 123 facilitates interactions between devices of multiple types (e.g., physical, virtual, mobile, desktop) through multiple mediums (e.g., web, cellular, satellite, etc.). For example, the input/output component 123 standardizes communications, and formats responses and/or action recommendations based on different interface types.

The context analysis engine 130 analyzes the context of a communication. The context analysis engine uses the natural language processing (NLP) component 131 to perform NLP comprising, for example, grammar cloning, grammar pruning, rules filtering, searching, restriction identification, restriction filtering and other processing to understand the communication context. As described further herein, the intent and sentiment classification components 133 and 134 are used to determine intent and sentiment of a communication.

The corpus data generation component 132 gathers and organizes words, phrases, intent and sentiment associated with dialog (e.g., sentence, message or other communication) of a user in connection with one or more subject areas (also referred to herein as "domains"). The corpus data generation component 132 provides these details to the data repository 140, which receives and processes information specific to users in the context of a given domain(s). The data repository 140 comprises a relationship graph generation component 141, which includes an ML layer 142 that uses one or more ML techniques to build relationship graphs corresponding to interactions between users and other persons, actions taken by the users and other persons and the domains in which the interactions and actions are taking place. The input from the corpus data generation component 132 is used as training data for the ML layer 142 of the relationship graph generation component 141. The data repository 140 stores the relationship graphs in a graph database 143 to provide a knowledge base of expertise for a plurality of users in given domains. The input from the corpus data generation component 132 is also used as training data for ML layers of the intent and sentiment classification components (see FIGS. 8 and 10, elements 864 and 1064).

The natural language to graph query interface 135 provides an interface to the graph data in the data repository 140 so that the graph data can be retrieved in response to natural language statements, queries or other natural language inputs. For example, the natural language to graph query interface 135 transforms a statement, query or other natural language input from natural language to a graph query statement to gather information from the data repository 140.

Given a particular situation, query and/or input, the decision engine 150 includes an action recommendation component 152 which uses one or ML techniques to recommend virtual assistant actions and/or other responses based on the data from the data repository 140. The recommended actions are performed automatically on behalf of a specific user based on learned behavior of that particular user. Such actions include, but are not necessarily limited to, outbound communications like email replies, scheduling and setting up a meeting and summarizing meetings. The type of actions and the decisions on what actions to take are driven by the information in the data repository 140, and based on the intent and sentiments identified by the intent and sentiment components 133 and 134 of the context analysis engine 130. The message generation and augmentation component 151 builds and/or augments outbound messages to be provided by virtual assistants 103. The messages are associated with a given situation, query and/or input, and are based on the information in the data repository 140 and the intent and sentiments identified by the intent and sentiment components 133 and 134 of the context analysis engine 130.

Figure 2:
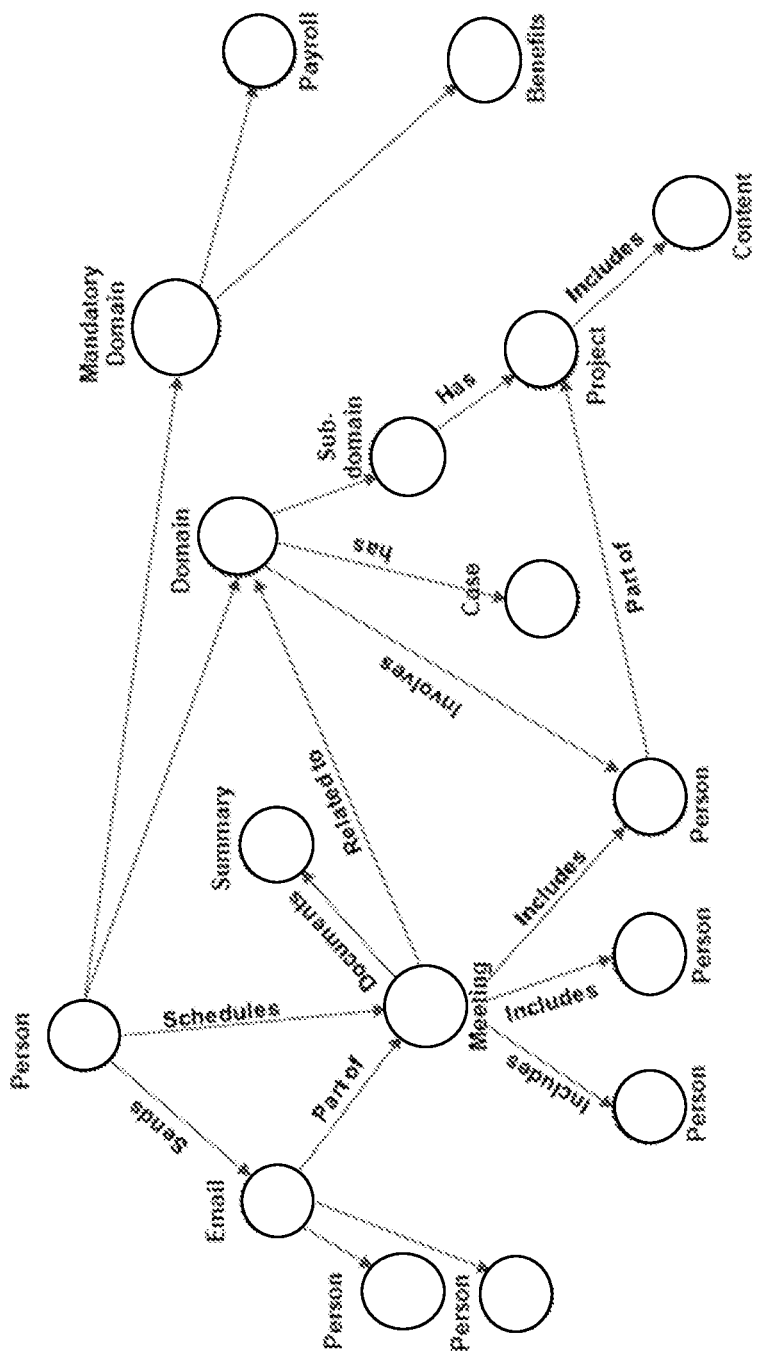
FIG. 2 depicts an example relationship graph according to an illustrative embodiment.

As can be seen in the example relationship graph 200 in FIG. 2, the embodiments identify relationships and concepts from the daily conversations, decisions, and actions of a plurality of people. The relationship graph generation component 141 generates graphs capturing the identified relationships and concepts for the plurality of people so that the decision engine 150 can retrieve and utilize information specific to a given user (e.g., person) to recommend virtual assistant actions tailored for the given user. Referring to the graph 200, concepts such as, for example, cases/incidents, projects, payroll and benefits, are created by the relationship graph generation component 141 based on the daily activities and interactions of a person who works with a number of enterprise domains (e.g., in this case, support and human resources domains). The relationships between nodes of the graph are illustrated by lines (also referred to herein as "edges"). As shown in the graph 200, the nodes comprise, for example, users/persons, domains, sub-domains, functions (e.g., payroll, benefits), utilities (e.g., email), activities or tasks (e.g., meetings, projects, cases) and information (e.g., content, summaries). The relationships that connect the nodes depend on the interactions between the nodes, and may include identifiers such as, for example, "schedules" and "attends" in the case of meetings or "sends" and "receives" in the case of email, and may involve multiple users/persons based on their involvement with each node. Other identifiers comprise, but are not necessarily limited to, "part of," "includes," "involves," "has," "documents" and/or "related to."

Figure 4B:
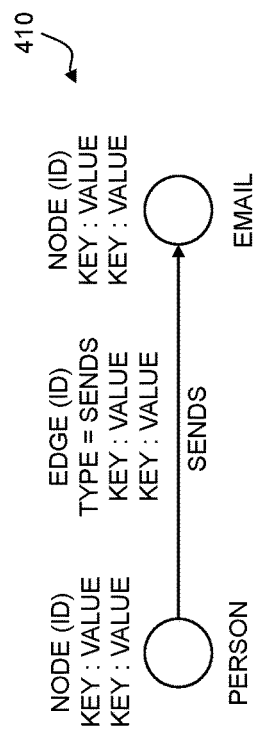
FIG. 4B depicts an example of a labeled property graph (LPG) format for a relationship graph according to an illustrative embodiment.
Figure 4A:
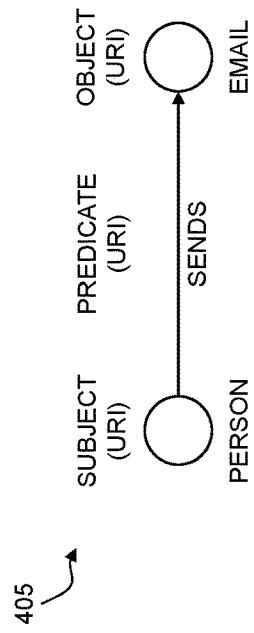
FIG. 4A depicts an example of a resource description framework (RDF) format for a relationship graph according to an illustrative embodiment.
Figure 5:
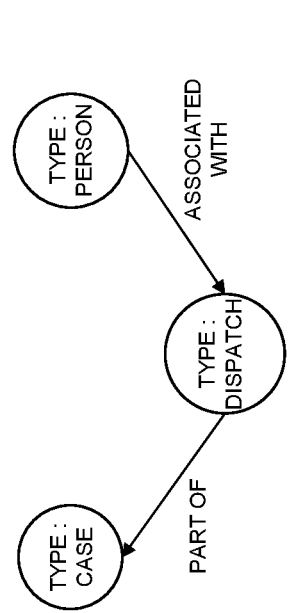
FIG. 5 depicts a table including details of conversion of a natural language query to a sub-graph query according to an illustrative embodiment.

Referring to FIGS. 4A and 4B, examples of a resource description framework (RDF) format 405 and a labeled property graph (LPG) format 410 for a relationship graph are shown. In accordance with embodiments, the RDF format or the LPG format can be used for storing information on and retrieving information from relationship graphs. The examples of the RDF and LPG formats are explained in terms of a person sending an email, but the embodiments are not limited thereto.

The RDF format 405 structures information (e.g., entities and relationship) as a triple comprising a subject, predicate and object. For example, a person who sends an email is stored as a subject (person), the predicate is the relationship (e.g., sends) and the object is the other entity (e.g., email). As can be seen, the subject is a node/entity in the graph. The predicate is an edge (e.g., relationship between nodes), and the object is another node. These nodes and edges are identified by unique identifiers (URIs), which are used to label the nodes and edges.

With the LPG format 410, each entity is represented as a node with a uniquely identifiable ID and a set of key-value pairs corresponding to properties that characterize the entity (e.g., in this case key-value pairs that identify the person and the utility (email)). The relationship between two entities comprises an edge, which is a connection between the nodes. Relationships are uniquely identified by a uniquely identifiable ID and a type (e.g., sends). Relationships are also represented by a set of key-value pairs corresponding to properties that characterize the connections. While two key-value pairs are shown as corresponding to each entity and relationship, the embodiments are not necessarily limited thereto, and more or less than two key-value pairs may be used to identify and characterize the nodes and edges.

According to one or more embodiments, the data repository 140 stores relationship graphs in the graph database 143 and provides relationship data from the relationship graphs in response to queries or other inputs. The graphical format permits data analysis and traversal at multiple levels in real-time and enables the real-time addition of new context and connections. Advantageously, the graph-based data repository 140 provides a foundation for maintaining data of an enterprise, which accelerates the growth and sustenance of long-term knowledge. The data repository 140 is capable of being enriched with raw and derived data over time, resulting in graphs that include increasing levels of details, context, truth, intelligence, and semantics. The graphical format is more indicative of a user's real-world ecosystem and domain than other representations of data, and provides a more efficient mechanism for search and retrieval of information than other approaches. Data can be retrieved from the data repository using a variety of query languages capable of traversing graphs such as, but not necessarily limited to, formats including structured query language (SQL) and SPARQL Referring to FIGS. 1, 5, 6 and 7, a natural language to graph query interface component 135/635 provides an interface to build graph query statements from natural language inputs in order to retrieve information from the data repository 140 comprising the graph database 143. As the information in the data repository 140 is stored in graphs which utilize nodes and edges as the relationships between nodes, querying the data requires using a graph query language. For example, the natural language to graph query interface component 135/635 converts natural language from email messages, chats and voice to text channels to graph queries.

Figure 6:
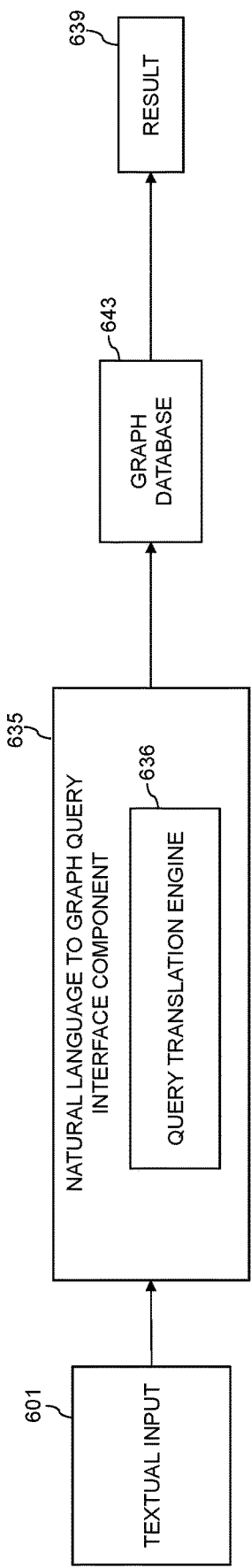
FIG. 6 depicts details of an operational flow for conversion of a natural language query to a graph query according to an illustrative embodiment.

As shown in FIG. 6, the natural language to graph query interface component 635 includes a query translation engine 636 implemented by a pipeline of NLP and ML components for prediction and classification of nodes and relationships from a textual input (e.g., natural language input). The natural language to graph query interface component 635, and more particularly, the query translation engine 636, takes a source query expressed in natural language and produces a target query expressed in a structured language (e.g., sub-graph query form). For example, referring to the table 500 in FIG. 5, the natural language query "Who is working on case 1002 from a field dispatch perspective?" is to be transformed into a sub-graph query with nodes representing person, case and dispatch, and edges representing the relationships between the nodes. The natural language query, target graph entities (nodes) and relationships (edges), and the sub-graph structure are shown in the table 500. For example, the target graph entities for nodes n0, n1 and n2 include the types: person, dispatch and case, along with their respective unique IDs, and corresponding attributes, which may be represented as key-value pairs in the case of an LPG format. The edges are defined as from n0 to n1 with the relationship "associated with" and from n1 to n2 with the relationship "part of." As can be seen, the sub-graph query is seeking a person who is associated with a dispatch that is part of a particular case (e.g., case 1002). As shown in FIG. 6, the graph query is provided to the graph database 643 (also graph database 143) and a result 639 comprising relationship data is generated based on the relationship graph(s) in the graph database 643.

Figure 7:
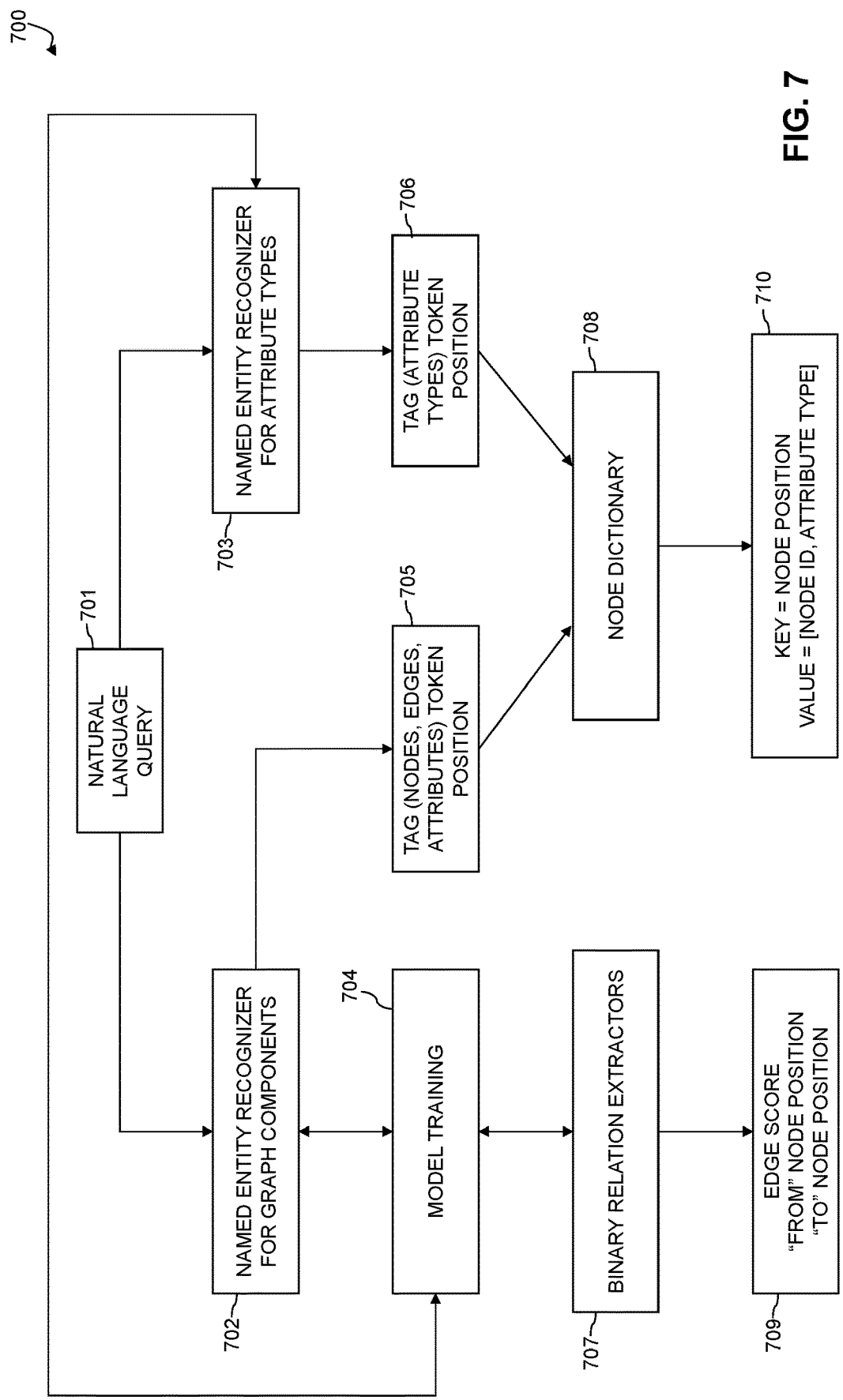
FIG. 7 depicts details of a process for conversion of a natural language query to a graph query according to an illustrative embodiment.

Referring to the process 700 in FIG. 7, translating a natural language query 701 into a structured query language (e.g., as performed by the query translation engine 636) requires several building blocks, which use NLP and NLU techniques to extract information such as key entities and their positions in a sentence or phrase and possible relationships between the key entities.

For example, two named entity recognizers 702 and 703 and n binary relation extractors 707 are trained (block 704), where n is the number of edge types in a graph. The named entity recognizer 702 corresponds to graph components, including nodes, edges, and attributes. The named entity recognizer 702 tags node, edge and attribute tokens and their positions in a given sentence or phrase (block 705). The named entity recognizer 703 corresponds to attribute types, and tags attribute type tokens and their positions in the sentence or phrase (block 706). Entries in a node dictionary (708) are used to define key-value pairs comprising node position (key) and node id and attribute type (value) (block 710).

Each binary relation extractor 707 produces a score for each edge type for every combination of two nodes in the sentence or phrase (block 709). Given a first edge type, a higher score for a given node combination than that for a second edge type for the same node combination indicates a higher likelihood of the first edge type connecting the nodes of the given node combination than the second edge type. After collecting and analyzing the scores and key-value information, each node, edge, and attribute is detected and processed.

Figure 8:
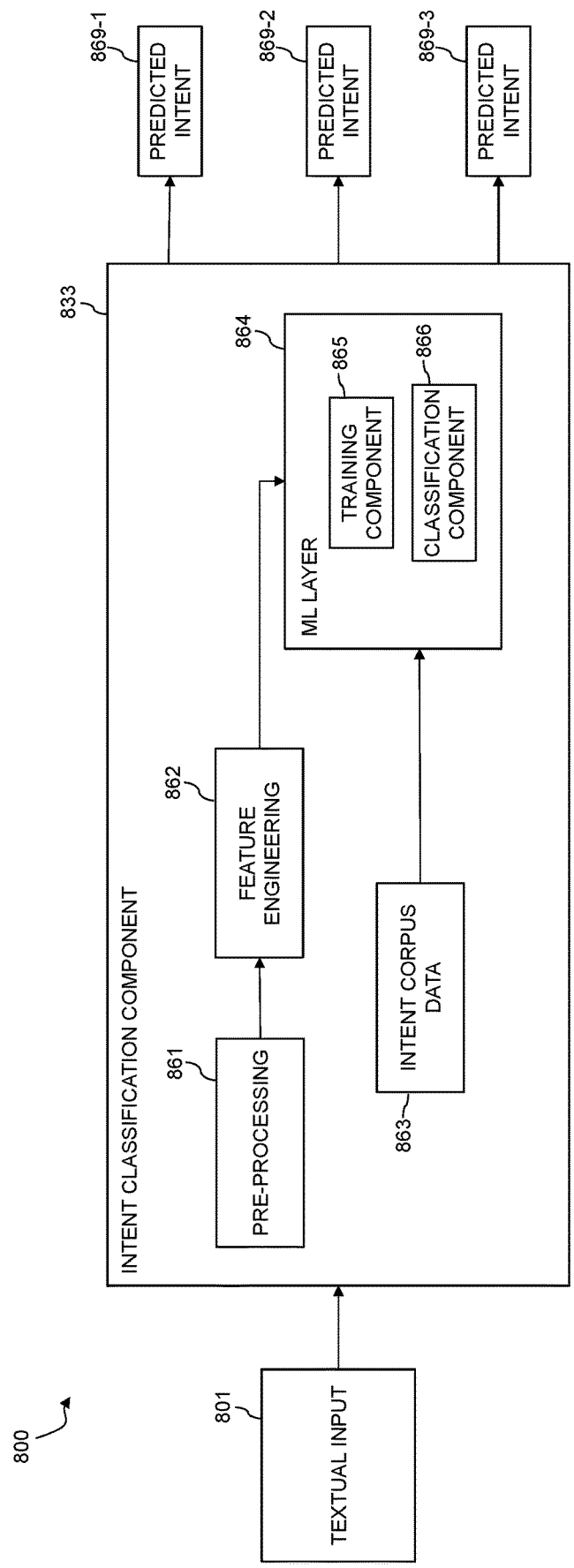
FIG. 8 depicts details of an operational flow for intent classification according to an illustrative embodiment.

Referring to FIGS. 1 and 8, the intent classification component 133/833 uses NLU and neural networks to analyze messages and classify intent. The embodiments base a dialog where the words come one after another over a period of time, on a time series model, and leverage a Recurrent Neural Network (RNN). In order to efficiently analyze a message, the embodiments use a bi-directional RNN, which uses two separate processing sequences, one from left to right and another from right to left. In order to address RNNs having exploding or vanishing gradient issues for longer and complex dialogs or messages, the embodiments utilize a bi-directional RNN with long short-term memory (LSTM) for the NLU.

The machine learning model used by the ML layer 864 is a bi-directional with LSTM model. Unlike a traditional neural network, where input and output are independent, in an RNN the output from a previous step feeds into the input of a current step. As a result, when performing language processing, previous words are taken into account when predicting subsequent words of a sentence. An RNN includes a hidden state which remembers one or more words in the sentence. The bi-directional RNN of the embodiments performs bi-directional processing of a sentence (from past and from future in two directions in parallel). A bi-directional RNN addresses problems where sentences are too long, and some previous words in the sentence are not available due to limited hidden states. In addition, LSTM utilized by the embodiments introduces advanced memory units and gates to an RNN to improve accuracy and performance of the machine learning model.

Referring to the operational flow 800 in FIG. 8, intent analysis by the intent classification component 833 (e.g., which is the same or similar to the intent classification component 133) uses intent corpus data 863 to train the ML model. This corpus data contains words and/or phrases and the corresponding intent associated with each of the words and/or phrases provided by the corpus data generation component 132. The training data is input to the training component 865 of the ML layer 864 to train the machine learning model.

Referring to FIG. 8, according to an embodiment, a pre-processing component 861 cleans any unwanted characters and stop words from the corpus data. The pre-processing further comprises stemming and lemmatization, as well as changing text to lower case, removing punctuation, and removing incorrect or unnecessary characters. Once pre-processing and data cleanup is performed, the feature engineering component 862 tokenizes the input list of words in the sentences and/or phrases. Tokenization can be performed using, for example, a Keras library or a natural language toolkit (NLTK) library. A Keras tokenizer class can be used to index the tokens. After tokenization is performed, the resulting words are padded to make the words have equal lengths so that the words can be used in the machine learning model. A list of intents is indexed and fed into the machine model for training. The intents may be one-hot encoded before being input to the model. Some features and/or parameters used in connection with the creation of the bi-directional RNN with LSTM model include an Adam optimizer, Softmax activation function, batch size and a number of epochs. These parameters or features are tuned to get the best performance and accuracy of the model. After the model is trained with the intent corpus training data 863, the model is used to predict the intent for incoming textual input 801 (e.g., natural language input) including, for example, dialogs and/or messages. The accuracy of the model is calculated for hyperparameter tuning.

Referring to the operational flow 800 for intent classification in FIG. 8, the textual input 801 (e.g., a natural language input) is pre-processed and engineered by the pre-processing and feature engineering components 861 and 862, and then input to the ML layer 864 so that intent can be classified by the classification component 866 using the trained machine learning model to generate predicted intents 869-1, 869-2 and 869-3. While three predicted intents are shown, more or less predicted intents can be generated. Some example predicted intents include, for example, send an email, schedule a meeting and prepare a meeting summary.

FIG. 9 depicts example pseudocode 900 for intent analysis and classification according to an illustrative embodiment. For the implementation of the intent classification component 133/833, Python language and NumPy, Pandas, Keras and NLTK libraries can be used.

Figure 10:
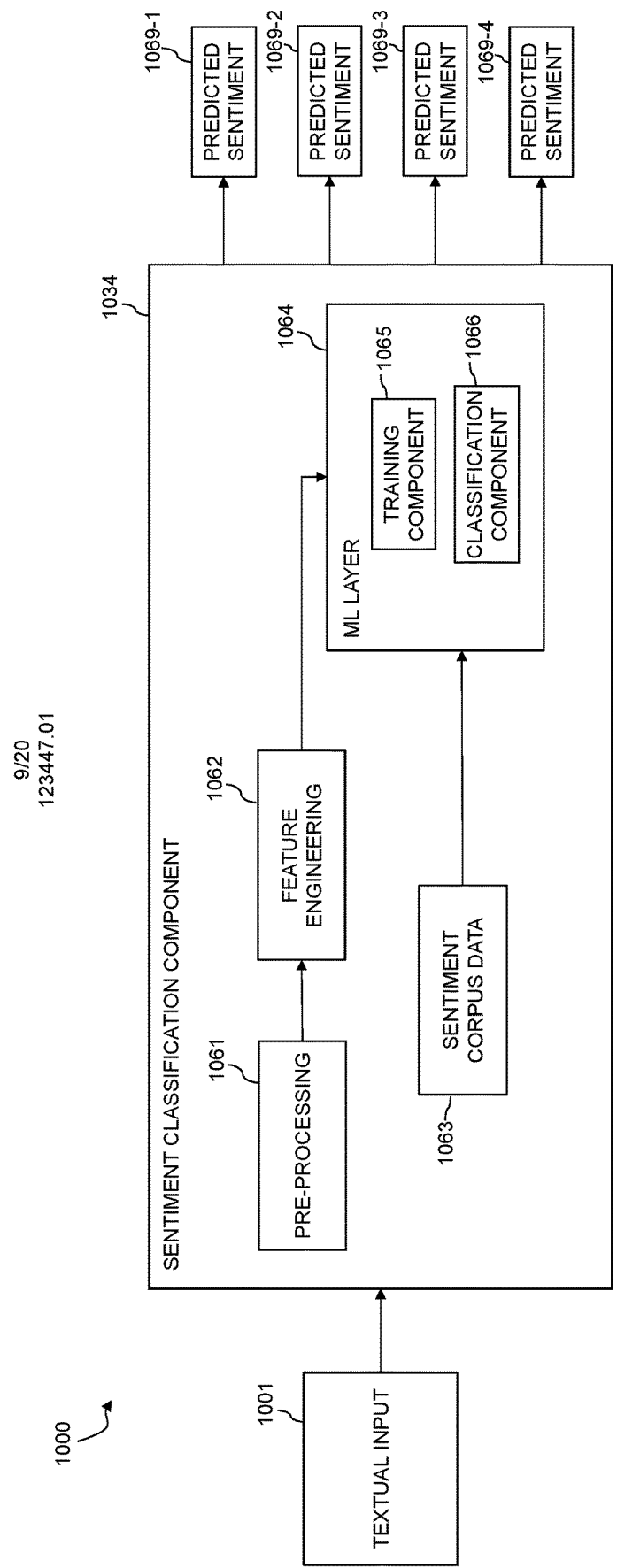
FIG. 10 depicts details of an operational flow for sentiment analysis and classification according to an illustrative embodiment.
Figure 11:
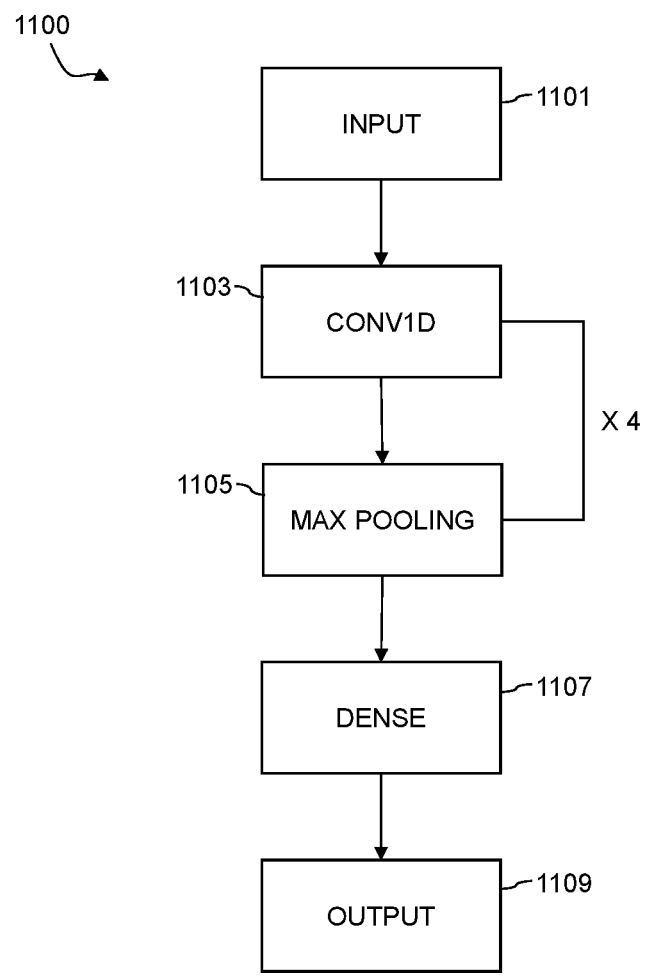
FIG. 11 depicts details of a speech-to-text model according to an illustrative embodiment.
Figure 12:
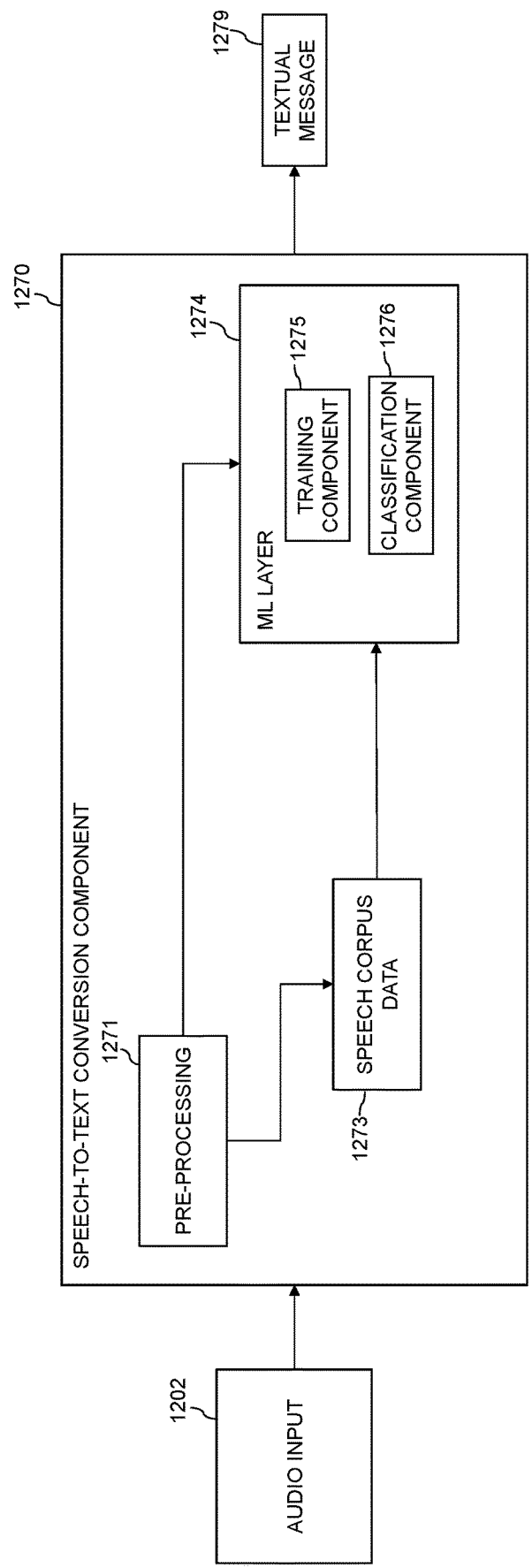
FIG. 12 depicts details of an operational flow for speech-to-text conversion according to an illustrative embodiment.

Referring to FIGS. 1 and 10, the sentiment classification component 134/1034 uses NLU to analyze messages and predict the sentiment of a dialog. Sentiment analysis assists with understanding message context and making appropriate decisions in a priority manner. In some embodiments, a virtual assistant will make decisions and perform tasks on behalf of a person based at least in part on the sentiment of messages from, for example, emails, text messaging via, for example, short message service (SMS) and/or voicemails. The sentiment classification component 134/1034 follows the same or similar patterns and algorithms as the intent classification component 133/833. Instead of intent corpus data, the sentiment classification component 134/1034 uses sentiment corpus data 1063 and follows the same or similar steps including data pre-processing with a pre-processing component 1061 and feature engineering with a feature engineering component 1062, before training a bi-directional RNN with LSTM model for predicting sentiment. Similar to the intent classification component 133/833, the sentiment classification component 134/1034 includes an ML layer 1064 with training and classification components 1065 and 1066.

Referring to the operational flow 1000 in FIG. 10, sentiment analysis by the sentiment classification component 1034 (e.g., which is the same or similar to the sentiment classification component 134) uses sentiment corpus data 1063 to train the machine learning model. This corpus data contains words and/or phrases and the corresponding sentiment associated with each of the words and/or phrases provided by the corpus data generation component 132. For example, sentiment refers to how a user's request can be characterized in terms of tone or a nature of a request (e.g., positive, negative, neutral, anxious, concerned, etc.). A priority of a request can be determined based on sentiment. For example, a negative, anxious or concerned sentiment may lead to an urgent or high priority, while a neutral or positive sentiment may lead to a normal, mid-level or low priority. The training data is input to the training component 1065 of the ML layer 1064 to train the machine learning model.

Referring to the operational flow 1000 for sentiment classification in FIG. 10, the textual input 1001 (e.g., a natural language input) is pre-processed and engineered by the pre-processing and feature engineering components 1061 and 1062, and then input to the ML layer 1064 so that sentiment can be classified (e.g., by the classification component 1066) using the trained machine learning model to generate predicted sentiments 1069-1, 1069-2, 1069-3 and 1069-4. While four predicted sentiments are shown, more or less predicted sentiments can be generated. Some example predicted sentiments include, for example, anxious, positive, neutral and negative.

Referring to FIGS. 1 and 11-13, the audio collection and conversion component 121 of the communication interface engine 120 includes a speech-to-text conversion component 1270, which converts audio input 1202 (e.g., natural language input received as audio signals) to text (e.g., textual message 1279) before being analyzed for intent, sentiment, and other context. The speech-to-text conversion component 1270 extracts features from an audio signal (e.g., voice input), which are input to a machine learning model of the ML layer 1274.

The audio input 1202 may be received in digital signal format. If the audio signals are in analog format, the signals can be converted into a digital format using, for example, the pre-processing component 1271, which performs conversion based on a sampling rate or sampling frequency, which corresponds to the number of samples selected per second. The pre-processing component 1271 extracts features from an audio signal, which are input to the ML layer 1274. In order to perform feature extraction, the pre-processing component may perform time domain analysis and frequency domain analysis. In time domain analysis, the audio signal is represented by amplitude as a function of time (e.g., a plot of amplitude versus time). In frequency domain analysis, the audio signal is represented by frequency as a function of amplitude (e.g., a plot of frequency versus amplitude). To represent features between frequency and time, a spectrogram is plotted.

In connection with feature extraction, the speech-to-text conversion component 1270 utilizes TensorFlow, which provides a speech commands dataset that includes one-second-long utterances of many words made by thousands of people. This data set makes up at least part of the speech corpus data 1273, which is input to the training component 1275 of the ML layer 1274 and used as training data for the speech-to-text machine learning model. For example, LibROSA and SciPy libraries can be used for audio processing in Python.

The classification component 1276 utilizes a neural network for feature learning and prediction of text (e.g., textual message 1279) from received audio input 1202. For example, referring to FIG. 11, in connection with an audio input 1101, a speech-to-text model 1100 uses a one-dimension convolutional neural network (CNN) referred to as Conv1d 1103, which may be implemented in TensorFlow and/or Keras. In this model 1100, there are four layers (×4) of Conv1d 1103, and max pooling 1105 is used.

As noted above an audio signal from an input 1101 or 1202 is pre-processed by the pre-processing component 1271 using sampling (if needed) and by removing speech spanning less than a given time period (e.g., 1 second). For a multi-classification use case, target value labels, which comprise categorical data, are encoded. Encoding may be performed using a LabelEncoder, which is a class available in a ScikitLearn library. Audio sample data is divided into training and test sets. In a non-limiting example, 80% of the audio sample data is training data and 20% of the data is test data. The training component 1275 trains the machine learning model with the training data set (speech corpus data 1273). The classification component 1276 utilizes four convolutional layers (Conv1d 1103 in FIG. 11) that use a rectifier linear unit (ReLu) function as the activation function. A dense layer 1107 is connected to the max pooling layer 1105, and can perform, for example, matrix-vector multiplication. The output layer 1109 uses, for example, Softmax, as the activation function. Categorical cross-entropy is used as the loss function (error or the difference between the predicted value and actual value) and an Adam optimizer is used by the machine learning model. FIG. 13 depicts example pseudocode 1300 for speech-to-text conversion using Keras, TensorFlow backend, and LibROSA and SciPy libraries.

As noted herein, the decision engine 150 makes decisions regarding how virtual assistants 103 will behave. More specifically, the message generation and augmentation component 151 generates an appropriate message for a virtual assistant to provide in response to a given input, and an action recommendation component 152 recommends appropriate actions for a virtual assistant to perform in response to a given input such as, for example, sending an email or scheduling a meeting.

Figure 14:
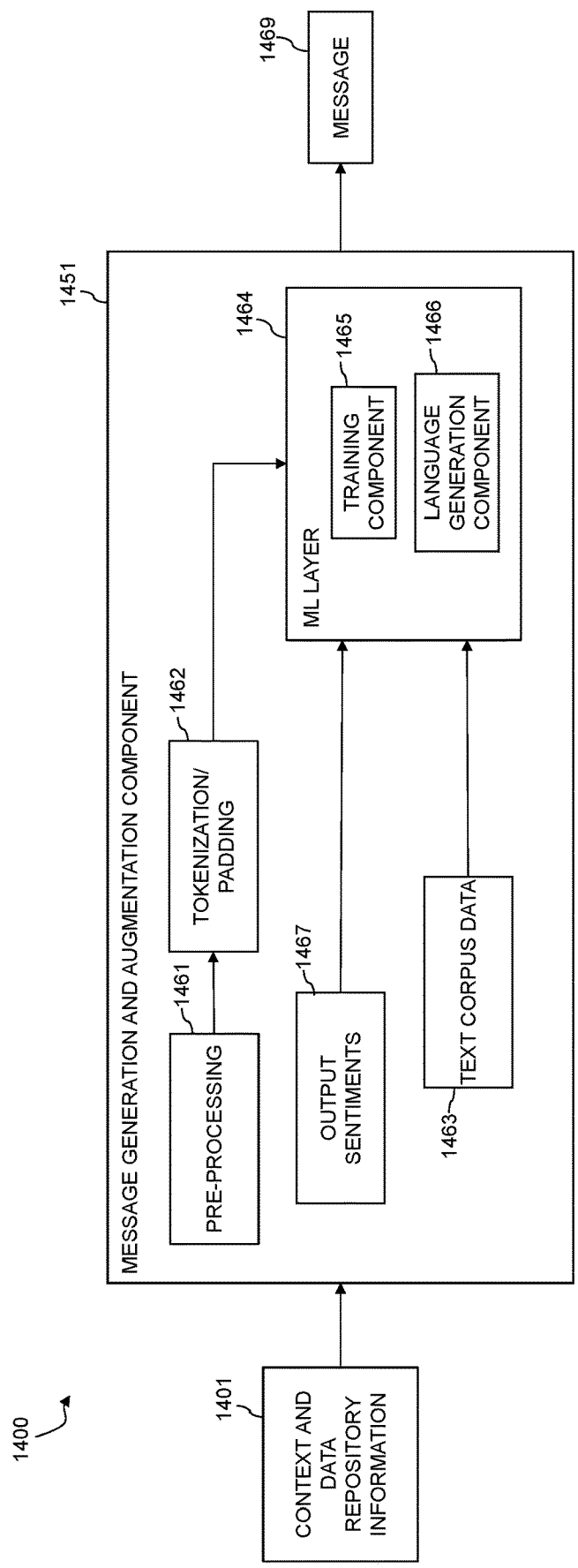
FIG. 14 depicts details of an operational flow for message generation and augmentation according to an illustrative embodiment.

Referring to FIGS. 1 and 14, the message generation and augmentation component 151/1451 uses NLG and machine learning to build outbound messages for virtual assistants 103. The outbound messages are based on context and information derived from the data repository 140 in order to provide an intelligent response for a given user. The ML layer 1464 utilizes a text generation language model (leveraging a unidirectional RNN with LSTM algorithm) that is trained with text corpus data 1463. The trained model learns the likelihood of occurrence of a word based on a previous sequence of words used in the text. Although language models can operate at various levels, according to one or more embodiments, the models operate at an n-gram level.

The message generation and augmentation component 151/1451 follows the same or similar dataset preparation steps as the intent and sentiment classification components 133/833 and 134/1034, including data pre-processing with a pre-processing component 1461. For example, dataset preparation includes removal of punctuation, stemming, lemmatization, converting words to lowercase, etc. The message generation and augmentation component 151/1451 uses a different corpus than the intent and sentiment classification components 133/833 and 134/1034 to train its machine learning model to perform NLG. The corpus 1463 includes dialog/text to be generated and associated words/tokens to be matched.

In the next step of language modeling, a tokenization/padding component 1462 tokenizes sentences by extracting tokens (e.g., terms/words) from the corpus. Keras tokenization functions can be used for this purpose. After datasets are generated with sequences of tokens, the sequences could vary in length. The tokenization/padding component 1462 performs padding to make these sequences the same length. Before the sequences are input into the ML layer 1464, predictors and labels are created. According to an embodiment, an n-gram sequence is selected as a predictor and the next word of the n-gram as a label.

Similar to the intent and sentiment classification components 833 and 1034, the message generation and augmentation component 1451 includes an ML layer 1464 with a training component 1465. The ML layer 1464 further includes a language generation component 1466. The model used by the ML layer 1464 comprises a unidirectional LSTM model, which is a type of RNN. The various layers in this model include:

1. Input Layer: Takes the sequence of words as input.
2. LSTM Layer: Computes the output using LSTM units. For example, 100 units are added in the layer, but this number can be tuned for accuracy.
3. Dropout Layer: A regularization layer which randomly deactivates some neurons in the LSTM layer to prevent over-fitting. This layer is optional.
4. Output Layer: Computes the probability of the best possible next word as output.

Once the machine learning model is trained with the predictors and labels, the language generation component 1466 generates an outbound message 1469 for a virtual assistant 103. Referring to the operational flow 1400 for message generation and augmentation in FIG. 14, input context and data repository information 1401 (e.g. a natural language input, context from, for example, the context analysis engine 130 and relationship data from the relationship graphs of the data repository 140) is pre-processed and engineered by the pre-processing and tokenization/padding components 1461 and 1462, and then input to the ML layer 1464 along with output sentiments 1467 from the sentiment classification component 134/1034. The ML layer 1464 (e.g., language generation component 1466) generates the outbound message 1469 for a virtual assistant 103. For example, the outbound message 1469 is transmitted to one or more of the virtual assistants 103 via the communication interface engine 120. FIG. 15 depicts example pseudocode 1500 for message generation and augmentation according to an illustrative embodiment. For the implementation of the message generation and augmentation component 151/1451, Python language and NumPy, Pandas and Keras libraries can be used.

Figure 17:
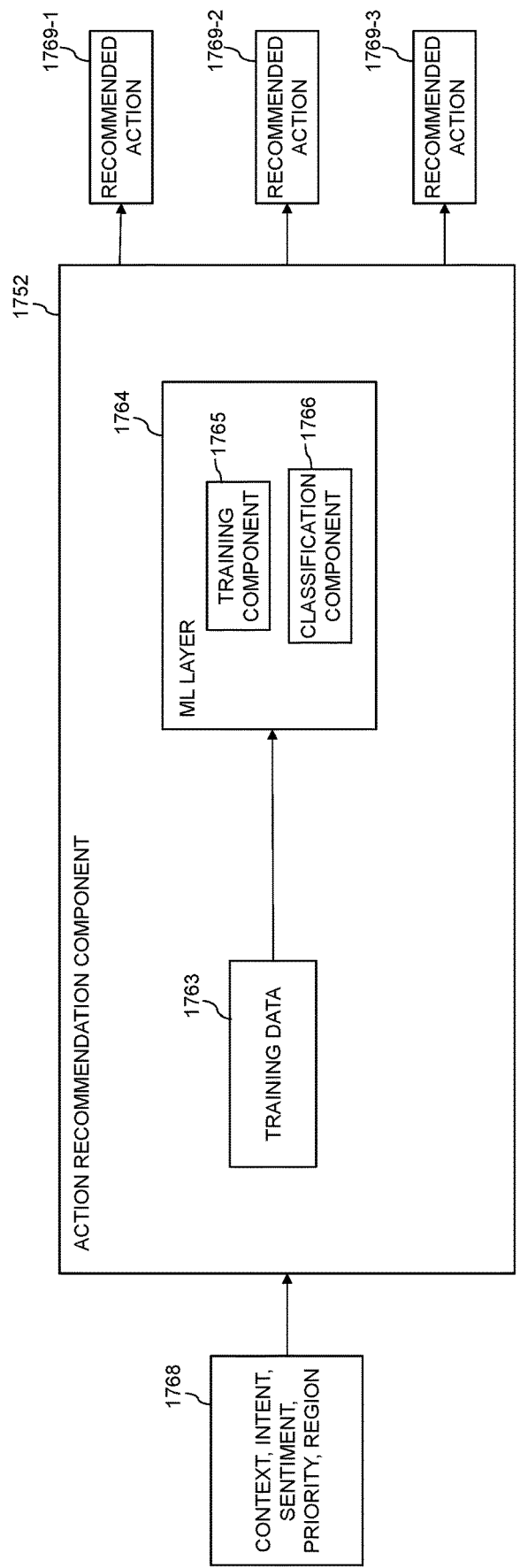
FIG. 17 depicts details of an operational flow for virtual assistant action recommendation according to an illustrative embodiment.

Referring to FIGS. 1 and 17, the action recommendation component 152/1752 uses context, intent, sentiments, and other information (e.g., priority and region) as input to identify and fulfill actions to be taken on behalf of a user. The type of action is derived from the intent and sentiment analysis performed by the context analysis engine 130, and based on the knowledge obtained from the data repository 140. In a non-limiting operational example, when an email associated with a topic or domain (case, project, etc.) is received, a search of the data repository 140 returns the context of the email, including, for example, the participants, and any past content or information. This context, along with intent and sentiments identified by the intent and sentiment classification components 133/833 and 134/1034 is input to a machine learning model (e.g., ML layer 1764) which classifies, using for example, classification component 1766, the type of action needed in this context. According to one or more embodiments, if the classification component 1766 recommends a reply message that must be sent, a reply message is generated using the message generation and augmentation component 151/1451 specified above. The reply message with the generated text may be sent, for example, to participants retrieved and identified from the data repository 140. Action identification and/or recommendation depends on various factors including, for example, context, history, intent, sentiment, priority, region, etc. Considering the complexity and dimensions of the data for making these decisions, the action recommendation component 152/1752 leverages ML algorithms for performance and accuracy.

For example, the action recommendation component 152/1752 leverages an ensemble, decision tree-based bagging technique referred to as Random Forest, for multinomial classification of actions. This model uses historical training data 1763 containing multi-dimension data points to train the model. A sample of the training data 1763 used to train the machine learning model (using, for example, training component 1765) is shown in the table 1600 in FIG. 16. For example, the training data includes actions each corresponding to, for example, a combination of an intent, a sentiment, a priority, a region and a context. For example, a schedule meeting action corresponds to a discussion intent, an anxious sentiment, an urgent priority, a global region and a case outage context. In another example, a reply to email action corresponds to a question intent, a neutral sentiment, a normal priority, an Americas region and a payroll context. The training data 1763 is input to the training component 1765 of the ML layer 1764 to train the machine learning model.

Once the model is fully trained, a state of the natural language input (e.g., intent, sentiment and context) is passed to the model so that the recommendation component 152/1752 can recommend an appropriate action for a virtual assistant 103 to perform. Referring to FIG. 17, a combination of context, intent, sentiment, priority and region 1768 are provided to the ML layer 1764 of the action recommendation component 1752 so that recommended virtual assistant actions 1769-1, 1769-2 and 1769-3 can be made based on the inputted data. While three recommended actions are shown, more or less recommended actions can be generated. Some example recommended actions include, for example, send an email, schedule a meeting and summarize a meeting.

The Random Forest algorithm uses a large group of complex decision trees and can provide predictions with high degree of accuracy on any size of data. In the action recommendation component 152/1752, the machine learning algorithm predicts the recommended virtual assistant action along with an accuracy percentage. Accuracy of the model can be improved by hyperparameter tuning.

FIG. 18 depicts example pseudocode 1800 for virtual assistant action recommendation according to an illustrative embodiment. The pseudocode 1800 references the use of a Random Forest classifier.

According to one or more embodiments, one or more of the databases (graph database 143, 637), knowledge bases (e.g., knowledge base 306), repositories (e.g., data repository 140) and/or corpuses (e.g., corpuses 863, 1063, 1273 and 1463) used by the virtual assistant development and communication platform 110 can be configured according to a relational database management system (RDBMS) (e.g., PostgreSQL). Databases, knowledge bases, repositories and/or corpuses in some embodiments are implemented using one or more storage systems or devices associated with the virtual assistant development and communication platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the virtual assistant development and communication platform 110, the communication interface engine 120, the context analysis engine 130, the data repository 140 and the decision engine 150 in other embodiments can be implemented at least in part externally to the virtual assistant development and communication platform 110, for example, as stand-alone servers, sets of servers or other types of systems coupled to the network 104. For example, the communication interface engine 120, the context analysis engine 130, the data repository 140 and the decision engine 150 may be provided as cloud services accessible by the virtual assistant development and communication platform 110.

The communication interface engine 120, the context analysis engine 130, the data repository 140 and the decision engine 150 in the FIG. 1 embodiment are each assumed to be implemented using at least one processing device. Each such processing device generally comprises at least one processor and an associated memory, and implements one or more functional modules for controlling certain features of the communication interface engine 120, the context analysis engine 130, the data repository 140 and/or the decision engine 150.

At least portions of the virtual assistant development and communication platform 110 and the components thereof may be implemented at least in part in the form of software that is stored in memory and executed by a processor. The virtual assistant development and communication platform 110 and the components thereof comprise further hardware and software required for running the virtual assistant development and communication platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the communication interface engine 120, the context analysis engine 130, the data repository 140, the decision engine 150 and other components of the virtual assistant development and communication platform 110 in the present embodiment are shown as part of the virtual assistant development and communication platform 110, at least a portion of the communication interface engine 120, the context analysis engine 130, the data repository 140, the decision engine 150 and other components of the virtual assistant development and communication platform 110 in other embodiments may be implemented on one or more other processing platforms that are accessible to the virtual assistant development and communication platform 110 over one or more networks. Such components can each be implemented at least in part within another system element or at least in part utilizing one or more stand-alone components coupled to the network 104.

It is assumed that the virtual assistant development and communication platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the communication interface engine 120, the context analysis engine 130, the data repository 140, the decision engine 150 and other components of the virtual assistant development and communication platform 110, and the elements thereof can each be implemented in the form of one or more LXCs running on one or more VMs. Other arrangements of one or more processing devices of a processing platform can be used to implement the communication interface engine 120, the context analysis engine 130, the data repository 140 and the decision engine 150, as well as other components of the virtual assistant development and communication platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the virtual assistant development and communication platform 110 to reside in different data centers. Numerous other distributed implementations of the virtual assistant development and communication platform 110 are possible.

Accordingly, one or each of the communication interface engine 120, the context analysis engine 130, the data repository 140, the decision engine 150 and other components of the virtual assistant development and communication platform 110 can each be implemented in a distributed manner so as to comprise a plurality of distributed components implemented on respective ones of a plurality of compute nodes of the virtual assistant development and communication platform 110.

It is to be appreciated that these and other features of illustrative embodiments are presented by way of example only, and should not be construed as limiting in any way.

Accordingly, different numbers, types and arrangements of system components such as the communication interface engine 120, the context analysis engine 130, the data repository 140, the decision engine 150 and other components of the virtual assistant development and communication platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the virtual assistant development and communication platform can be offered to cloud infrastructure customers or other users as part of FaaS, CaaS and/or PaaS offerings.

Figure 19:
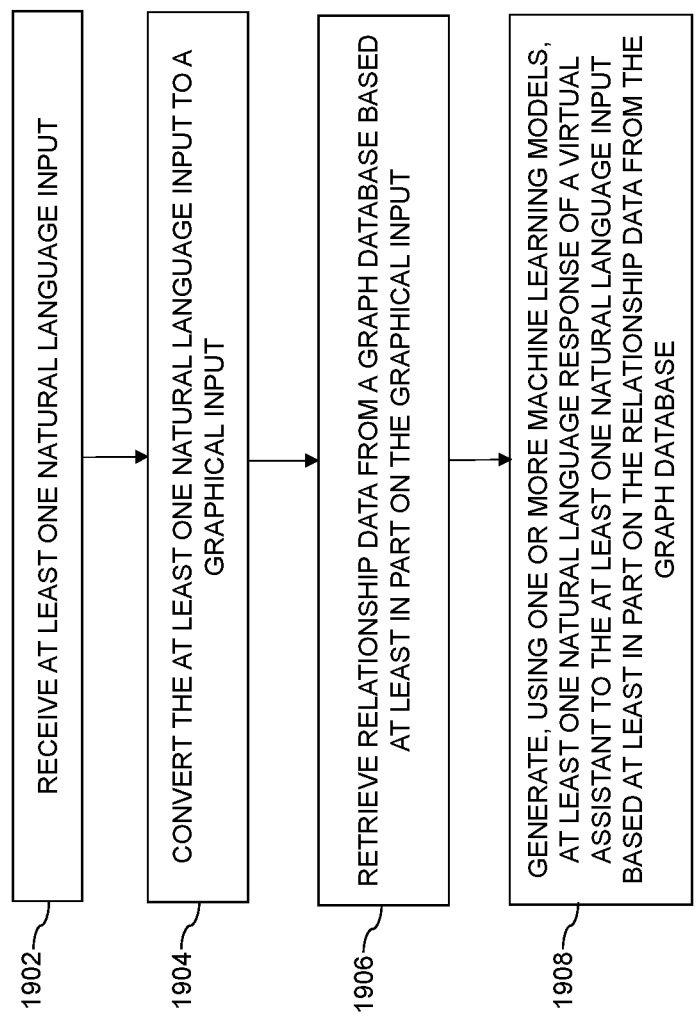
FIG. 19 depicts a process for analyzing incoming natural language inputs and recommending appropriate virtual assistant responses according to an illustrative embodiment.

The operation of the information processing system 100 will now be described in further detail with reference to the flow diagram of FIG. 19. With reference to FIG. 19, a process 1900 for analyzing incoming natural language inputs and recommending appropriate virtual assistant responses as shown includes steps 1902 through 1908, and is suitable for use in the system 100 but is more generally applicable to other types of information processing systems comprising a virtual assistant development and communication platform configured for analyzing incoming natural language inputs and recommending appropriate virtual assistant responses.

In step 1902, at least one natural language input is received, and in step 1904, the at least one natural language input is converted to a graphical input. The at least one natural language input can be in a speech format and converted from the speech format to a text format. Converting the at least one natural language input to a graphical input may comprise identifying a plurality of pairs of nodes from the at least one natural language input, and calculating respective scores corresponding to a plurality of relationship types for the plurality of pairs of nodes.

In step 1906, relationship data is retrieved from a graph database based at least in part on the graphical input. The graph database comprises one or more relationship graphs comprising the relationship data. The one or more relationship graphs comprise relationships between a plurality of nodes, wherein the relationships comprise edges of the one or more relationship graphs. In one or more embodiments, the plurality of nodes comprise at least one of one or more persons, one or more domains, one or more sub-domains, one or more functions, one or more utilities and one or more activities. The relationships comprise interactions between respective pairs of the plurality of nodes. In illustrative embodiments, the one or more relationship graphs are in one of an RDF format and an LPG format.

In step 1908, at least one natural language response of a virtual assistant to the at least one natural language input is generated based at least in part on the relationship data from the graph database. At least the generating of the natural language response is performed using one or more machine learning models.

The process may further comprise determining an intent and/or a sentiment of the at least one natural language input, wherein the at least one natural language response of the virtual assistant is based at least in part on the determined intent and/or the determined sentiment. The determining of the intent and the sentiment are performed using the one or more machine learning models.

In one or more embodiments, a plurality of natural language inputs corresponding to at least one user of a plurality of users are received and analyzed, and a relationship graph corresponding to the at least one user is generated based at least in part on the analyzing. The analyzing and generating are performed using the one or more machine learning models. The analyzing of the plurality of natural language inputs may comprise determining at least one of intent and sentiment of the plurality of natural language inputs.

According to the embodiments, at least one action for the virtual assistant to perform in response to the at least one natural language input is recommended based at least in part on the relationship data from the graph database. The recommending is performed using one or more machine learning models. The one or more machine learning models are trained with data comprising at least one of a plurality of intents, a plurality of sentiments, a plurality of priorities and a plurality of contexts corresponding to respective ones of a plurality of actions. In one or more embodiments, a plurality of natural language inputs corresponding to at least one user of a plurality of users are received, and the one or more machine learning models are trained with data from the plurality of natural language inputs.

It is to be appreciated that the FIG. 19 process and other features and functionality described above can be adapted for use with other types of information systems configured to execute virtual assistant development and communication services in a virtual assistant development and communication platform or other type of platform.

The particular processing operations and other system functionality described in conjunction with the flow diagram of FIG. 19 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 19 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a virtual assistant development and communication platform as disclosed herein can provide a number of significant advantages relative to conventional arrangements. For example, unlike conventional techniques, the embodiments advantageously use machine learning techniques to analyze incoming natural language inputs and recommend appropriate virtual assistant responses. The embodiments provide functionality for domain and user-specific virtual assistants that learn and build expertise associated with particular users over time. As an additional advantage, missed experiences such as, for example, meetings can be re-lived by utilizing the virtual assistants of the embodiments to summarize meetings and provide additional information to users based on relationship graphs in a graph data repository.

Advantageously, the embodiments provide an optimized machine learning framework that combines select machine learning techniques to provide intelligent virtual assistants that respond to natural language inputs with messages and actions that are tailored for particular users. The virtual assistants accumulate a person's domain expertise over time by being associated with multiple conversations and meetings of the person, and others with which the person communicates. As a result, the virtual assistants may automatically maintain and manage user data, brief the user on communications and/or meetings for which the user is not able to participate, clarify questions, and perform functions on behalf of the user. The virtual assistant development and communication platform enables virtual assistants to virtually converse with others and perform tasks in a way that mimics how a particular user would communicate or perform tasks.

The virtual assistant development and communication platform builds a domain expertise repository based on relationships of users with individuals, utilities, tasks, activities and subject areas in ecosystems in which the users operate. The repository provides machine learning models with data to enable virtual assistants to intelligently respond to situations presented in the form of natural language inputs. Responses are based on the relationship data from the repository and can be in the form of textual or speech messages generated by the virtual assistant development and communication platform and/or actions recommended by the virtual assistant development and communication platform. For example, based on output from the virtual assistant development and communication platform, the virtual assistants analyze and reply to emails, record conversations, schedule meetings and interpret telephone calls.

With conventional techniques, virtual assistant communication fails to take into account knowledge and relationships of specific users when providing responses, and typically provides only generic responses. For example, when certain users are unavailable, their subject matter expertise is not available to other members of an organization. In addition, when people miss important meetings or events, they need to spend time recreating such events in order to learn what they missed. Advantageously, the embodiments enable virtual assistants to respond to others with the subject matter expertise of a given user, and to automatically brief users with useful information corresponding to new matters that they may have missed while they were not present.

As an additional advantage, the embodiments combine NLP, NLU and other linguistic analysis using stemming and lemmatization to identify the context of natural language inputs and respond with meaningful responses. The embodiments further perform intent and sentiment analysis to identify the intent of communications, as well as positive, negative or neutral emotional intensity of words, phrases, symbols, punctuation, and emojis. The embodiments also advantageously convert queries from natural language to graph query statements to process data from relationship graphs of the data repository.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the virtual assistant development and communication platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a virtual assistant development and communication platform in illustrative embodiments. These and other cloud-based systems in illustrative embodiments can include object stores.

Illustrative embodiments of processing platforms will now be described in greater detail with reference to FIGS. 20 and 21. Although described in the context of system 100, these platforms may also be used to implement at least portions of other information processing systems in other embodiments.

Figure 20:
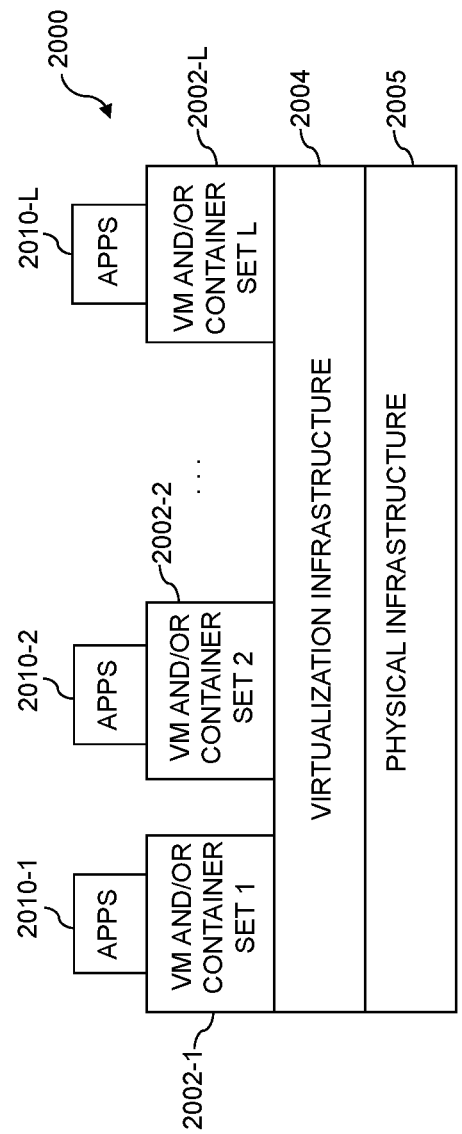
FIGS. 20 and 21 show examples of processing platforms that may be utilized to implement at least a portion of an information processing system according to illustrative embodiments.
Figure 21:
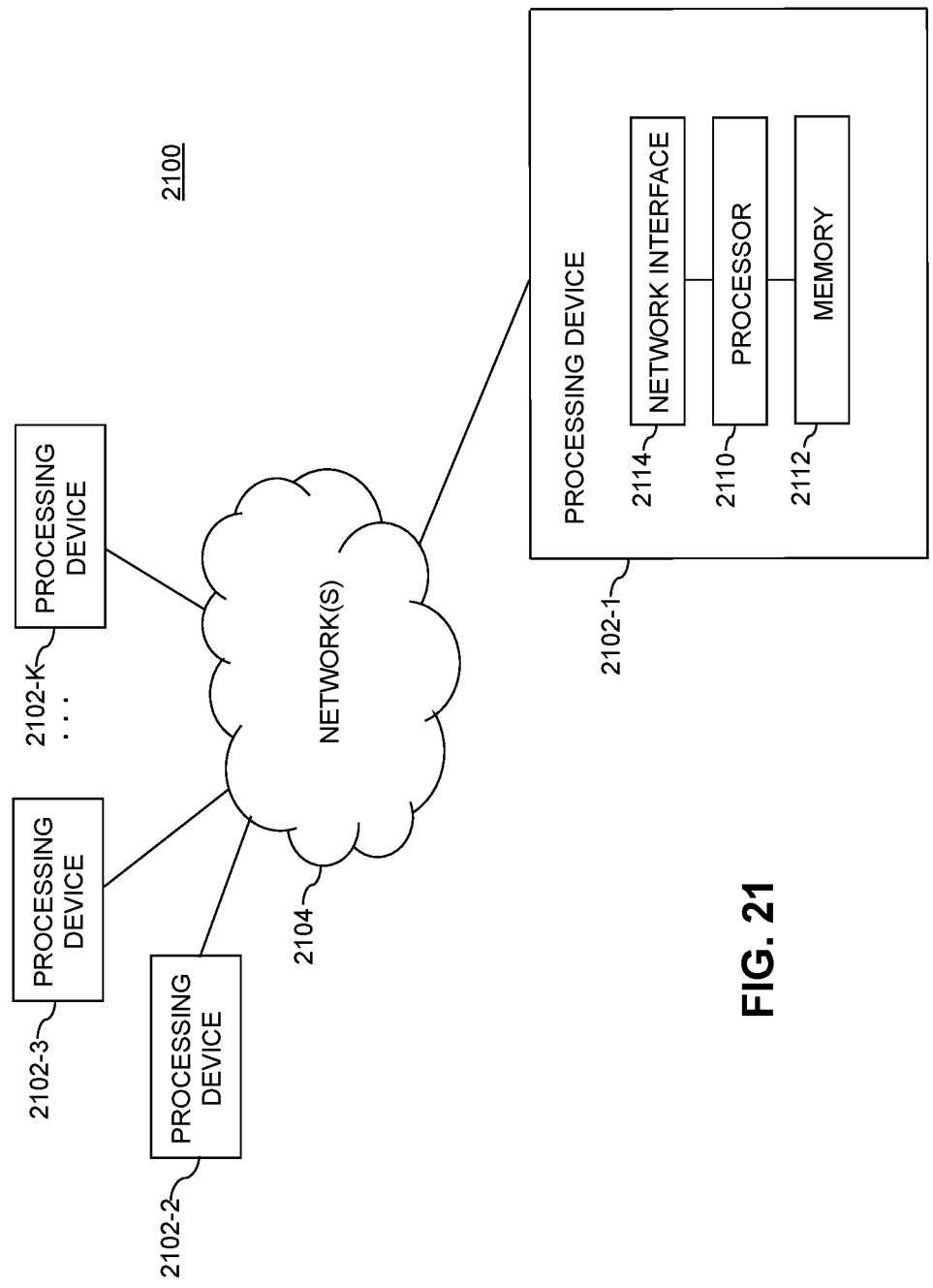

FIG. 20 shows an example processing platform comprising cloud infrastructure 2000. The cloud infrastructure 2000 comprises a combination of physical and virtual processing resources that may be utilized to implement at least a portion of the information processing system 100. The cloud infrastructure 2000 comprises multiple virtual machines (VMs) and/or container sets 2002-1, 2002-2, . . . 2002-L implemented using virtualization infrastructure 2004. The virtualization infrastructure 2004 runs on physical infrastructure 2005, and illustratively comprises one or more hypervisors and/or operating system level virtualization infrastructure. The operating system level virtualization infrastructure illustratively comprises kernel control groups of a Linux operating system or other type of operating system.

The cloud infrastructure 2000 further comprises sets of applications 2010-1, 2010-2, . . . 2010-L running on respective ones of the VMs/container sets 2002-1, 2002-2, . . . 2002-L under the control of the virtualization infrastructure 2004. The VMs/container sets 2002 may comprise respective VMs, respective sets of one or more containers, or respective sets of one or more containers running in VMs.

In some implementations of the FIG. 20 embodiment, the VMs/container sets 2002 comprise respective VMs implemented using virtualization infrastructure 2004 that comprises at least one hypervisor. A hypervisor platform may be used to implement a hypervisor within the virtualization infrastructure 2004, where the hypervisor platform has an associated virtual infrastructure management system. The underlying physical machines may comprise one or more distributed processing platforms that include one or more storage systems.

In other implementations of the FIG. 20 embodiment, the VMs/container sets 2002 comprise respective containers implemented using virtualization infrastructure 2004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2000 shown in FIG. 20 may represent at least a portion of one processing platform. Another example of such a processing platform is processing platform 2100 shown in FIG. 21.

The processing platform 2100 in this embodiment comprises a portion of system 100 and includes a plurality of processing devices, denoted 2102-1, 2102-2, 2102-3, . . . 2102-P, which communicate with one another over a network 2104.

The network 2104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2102-1 in the processing platform 2100 comprises a processor 2110 coupled to a memory 2112. The processor 2110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2112 may comprise random access memory (RAM), read-only memory (ROM), flash memory or other types of memory, in any combination. The memory 2112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2102-1 is network interface circuitry 2114, which is used to interface the processing device with the network 2104 and other system components, and may comprise conventional transceivers.

The other processing devices 2102 of the processing platform 2100 are assumed to be configured in a manner similar to that shown for processing device 2102-1 in the figure.

Again, the particular processing platform 2100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the virtual assistant development and communication platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and virtual assistant development and communication platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
receiving at least one natural language input directed to at least one user;
determining a plurality of attributes characterizing the at least one natural language input;
converting the at least one natural language input to a graphical input;
retrieving relationship data from a graph database based at least in part on the graphical input;
identifying from the relationship data one or more additional users having a relationship with the at least one user;
generating at least one natural language response of a virtual assistant to the at least one natural language input based at least in part on the relationship data from the graph database and the plurality of attributes characterizing the at least one natural language input; and
recommending at least one action to perform in response to the at least one natural language input based at least in part on the relationship data from the graph database and the plurality of attributes characterizing the at least one natural language input, wherein the at least one action comprises coordinating communication between the at least one user and the one or more additional users;
wherein at least the determining, generating and recommending are performed using one or more machine learning models; and
wherein the steps of the method are executed by a processing device operatively coupled to a memory.

2. The method claim 1 wherein:
determining the plurality of attributes characterizing the at least one natural language input comprises determining an intent of the at least one natural language input; and
the at least one natural language response of the virtual assistant is based at least in part on the determined intent.

3. The method claim 1 wherein:
determining the plurality of attributes characterizing the at least one natural language input comprises determining a sentiment of the at least one natural language input; and
the at least one natural language response of the virtual assistant is based at least in part on the determined sentiment.

4. The method of claim 1 wherein the graph database comprises one or more relationship graphs comprising the relationship data, the one or more relationship graphs comprising relationships between a plurality of nodes, wherein the relationships comprise edges of the one or more relationship graphs.

5. The method of claim 4 wherein the plurality of nodes comprise at least one of one or more persons, one or more domains, one or more sub-domains, one or more functions, one or more utilities and one or more activities.

6. The method of claim 5 wherein the relationships comprise interactions between respective pairs of the plurality of nodes.

7. The method of claim 4 wherein the one or more relationship graphs are in one of a resource description framework (RDF) format and a labeled property graph (LPG) format.

8. The method of claim 4 further comprising:
receiving a plurality of natural language inputs corresponding to the at least one user of a plurality of users;
analyzing the plurality of natural language inputs; and
generating a relationship graph of the one or more relationship graphs corresponding to the at least one user based at least in part on the analyzing;
wherein the analyzing and generating are performed using the one or more machine learning models.

9. The method of claim 8 wherein the analyzing of the plurality of natural language inputs comprises determining at least one of intent and sentiment of the plurality of natural language inputs.

10. The method of claim 1 further comprising training the one or more machine learning models with data comprising at least one of a plurality of intents, a plurality of sentiments, a plurality of priorities and a plurality of contexts corresponding to respective ones of a plurality of actions.

11. The method of claim 1 wherein the at least one natural language input is in a speech format and the method further comprises converting the at least one natural language input from the speech format to a text format.

12. The method of claim 1 further comprising:
receiving a plurality of natural language inputs corresponding to the at least one user of a plurality of users; and
training the one or more machine learning models with data from the plurality of natural language inputs.

13. The method of claim 1, wherein converting the at least one natural language input to a graphical input comprises:
identifying a plurality of pairs of nodes from the at least one natural language input; and
calculating respective scores corresponding to a plurality of relationship types for the plurality of pairs of nodes.

14. The method of claim 1 wherein the coordinating of communication between the at least one user and the one or more additional users comprises scheduling a conference between the at least one user and the one or more additional users.

15. An apparatus comprising:
a processing device operatively coupled to a memory and configured:
to receive at least one natural language input directed to at least one user;
to determine a plurality of attributes characterizing the at least one natural language input
to convert the at least one natural language input to a graphical input;
to retrieve relationship data from a graph database based at least in part on the graphical input;
to identify from the relationship data one or more additional users having a relationship with the at least one user;
to generate at least one natural language response of a virtual assistant to the at least one natural language input based at least in part on the relationship data from the graph database and the plurality of attributes characterizing the at least one natural language input; and
to recommend at least one action to perform in response to the at least one natural language input based at least in part on the relationship data from the graph database and the plurality of attributes characterizing the at least one natural language input, wherein the at least one action comprises coordinating communication between the at least one user and the one or more additional users;
wherein the processing device is configured to use one or more machine learning models to perform at least the determining, generating and recommending.

16. The apparatus of claim 15 wherein the graph database comprises one or more relationship graphs comprising the relationship data, the one or more relationship graphs comprising relationships between a plurality of nodes, wherein the relationships comprise edges of the one or more relationship graphs.

17. The apparatus of claim 16 wherein the plurality of nodes comprise at least one of one or more persons, one or more domains, one or more sub-domains, one or more functions, one or more utilities and one or more activities.

18. The apparatus of claim 16 wherein the processing device is further configured:
to receive a plurality of natural language inputs corresponding to the at least one user of a plurality of users;
to analyze the plurality of natural language inputs; and
to generate a relationship graph of the one or more relationship graphs corresponding to the at least one user based at least in part on the analyzing;
wherein the processing device is configured to use one or more machine learning models to perform the analyzing and generating.

19. An article of manufacture comprising a non-transitory processor-readable storage medium having stored therein program code of one or more software programs, wherein the program code when executed by at least one processing device causes said at least one processing device to perform the steps of:
receiving at least one natural language input directed to at least one user;
determining a plurality of attributes characterizing the at least one natural language input converting the at least one natural language input to a graphical input;
retrieving relationship data from a graph database based at least in part on the graphical input;
identifying from the relationship data one or more additional users having a relationship with the at least one user;
generating at least one natural language response of a virtual assistant to the at least one natural language input based at least in part on the relationship data from the graph database and the plurality of attributes characterizing the at least one natural language input; and
recommending at least one action to perform in response to the at least one natural language input based at least in part on the relationship data from the graph database and the plurality of attributes characterizing the at least one natural language input, wherein the at least one action comprises coordinating communication between the at least one user and the one or more additional users;
wherein at least the determining, generating and recommending are performed using one or more machine learning models.

20. The article of manufacture of claim 19 wherein the coordinating of communication between the at least one user and the one or more additional users comprises scheduling a conference between the at least one user and the one or more additional users.

\* \* \* \* \*